United States Patent [19]
Deeba et al.

[11] Patent Number: 6,150,291
[45] Date of Patent: Nov. 21, 2000

[54] METHOD OF ABATING $NO_X$ AND PREPARATION OF CATALYTIC MATERIAL THEREFOR

[75] Inventors: Michel Deeba, North Brunswick; Jennifer S. Feeley, Clinton; Robert J. Farrauto, Westfield, all of N.J.

[73] Assignee: Engelhard Corporation, Iselin, N.J.

[21] Appl. No.: 09/250,652

[22] Filed: Feb. 16, 1999

Related U.S. Application Data

[62] Division of application No. 08/430,065, Apr. 27, 1995.
[51] Int. Cl.[7] ....................................................... B01J 29/04
[52] U.S. Cl. .................................. 502/60; 502/64; 502/66; 502/71; 502/74; 502/77
[58] Field of Search .................................. 502/74, 78, 79, 502/77, 60, 64, 66, 71

[56] References Cited

U.S. PATENT DOCUMENTS

| | | | |
|---|---|---|---|
| 4,431,746 | 2/1984 | Rollman | 502/73 |
| 4,963,332 | 10/1990 | Brand et al. | 423/235 |
| 5,078,979 | 1/1992 | Dunne | 423/212 |

FOREIGN PATENT DOCUMENTS 0 503 882  3/1992  European Pat. Off. .

*Primary Examiner*—Thomas Dunn
*Attorney, Agent, or Firm*—Richard A. Negin

[57] ABSTRACT

A method for reducing gaseous nitrogen oxides present in a gas stream by reaction with a reductant species is practiced by flowing the gas stream under lean $NO_X$-reducing conditions in contact with a catalytic material containing a catalytically effective amount of a catalytic species, e.g., a platinum group metal, and a reductant storage material, e.g., a zeolite, effective for storing reductant species for reaction with $NO_X$, and providing an intermittent supply of the reductant to the gas stream. The catalytic material may be prepared in any manner, but one method is to incorporate a catalytically effective amount of the platinum into a template-bearing molecular sieve material, preferably ZSM-5, to hinder the platinum from being incorporated into the pores of the molecular sieve material, and then calcining the molecular sieve material, whereby the template is removed from the molecular sieve material after the platinum is incorporated therein. Another method is to add a blocking agent to the molecular sieve material, then incorporate the platinum therein, and then calcine the material to remove the blocking agent. The catalytic material may contain less than about two percent by weight of zeolite plus platinum, e.g., less than about 0.5%, or from about 0.025% to 0.1% or 0.2% platinum.

6 Claims, 16 Drawing Sheets

METHOD OF ABATING $NO_X$ AND PREPARATION OF CATALYTIC MATERIAL THEREFOR

This application is a divisional of copending application Ser. No. 08/430,065 filed Apr. 27, 1995.

BACKGROUND OF THE INVENTION

1. Field of the Invention

This invention relates to catalytic materials for the treatment of gas streams, and in particular to catalytic materials effective for the reduction of nitrogen oxides ($NO_X$). Nitrogen oxides are well-known noxious by-products of the high temperature combustion of hydrocarbon fuels by internal combustion engines. The release of these oxides as exhaust emissions has caused environmental concerns leading to governmental regulations that compel motor vehicle manufacturers to abate the emission of $NO_X$. Efforts towards compliance with such regulations are complicated by the fact that the exhaust gas streams containing $NO_X$ typically also contain other pollutants which are typically abated through oxidation reactions, whereas $NO_X$ abatement is typically carried out as a reduction reaction in which it is desired to reduce the $NO_X$ to nitrogen while minimizing the formation of $N_2O$ and sulfates. Conventional three-way catalysts, which are known for their ability to abate hydrocarbons, carbon monoxide and $NO_X$ under stoichiometric conditions, are not effective for $NO_X$ reduction in lean environments, i.e., in environments in which oxygen is present in excess of the stoichiometric quantity required to oxidize the hydrocarbons, partially burned hydrocarbons and carbon monoxide in the gas stream.

2. Related Art

One known method for the reduction of $NO_X$ from lean emissions is to flow the exhaust gas containing the $NO_X$ in contact with a zeolite catalytic material comprising, for example, ZSM-5, which has been ion-exchanged with copper. Such catalyst was found to reduce $NO_X$ under lean conditions using unburned hydrocarbons in the exhaust gas as reductants, and was found to be effective at temperatures from about 350° C. to 550° C. However, such catalysts are often lacking in durability, in that catalytic performance usually decreases significantly after exposure of the catalyst to high temperature steam and/or $SO_2$.

Catalysts based on platinum-containing materials have also been found to abate $NO_X$ in lean environments, but such catalysts tend to produce excessive quantities of $N_2O$, and also to oxidize $SO_2$, which is present in the exhaust as a result of the oxidation of the sulfur component of fuels, to $SO_3$. Both products are undesirable; $N_2O$ fosters an environmental greenhouse effect while $SO_3$ contributes to the formation of particulate matter in exhaust emissions by reacting to form sulfates which add to the particulate mass. Accordingly, there is a need for a catalyst that reduces $NO_X$ to $N_2$ while producing only limited quantities of $N_2O$ and $SO_3$.

Japanese Patent H1-135541 (1989) of Toyota Jidosha K.K. et al discloses a catalyst for reducing $NO_X$ in lean car exhaust comprising zeolites that contain one or more platinum group metals, including ruthenium, by ion-exchange into the zeolite. In the exemplified embodiments, 100 grams of a washcoat comprising 150 parts zeolite and 40 parts of a mixture of alumina sol and silica sol having a 50:50 Al:Si ratio is coated onto a carrier. The following amounts of platinum group metals are then incorporated into the zeolites: in Examples 1 and 2, 1.0 gram platinum (1.27% by weight of zeolite plus platinum) and 0.2 grams rhodium (0.25% by weight zeolite plus rhodium); Example 3, 1.0 gram palladium; Example 4, 1.2 grams ruthenium (1.5% by weight zeolite plus ruthenium); Example 5, 1.2 grams iridium. Comparative examples were prepared without zeolite.

U.S. Pat. No. 5,330,732 to Ishibashi et al, dated Jul. 19, 1994, teaches that one or more of platinum, palladium and rhodium can be loaded onto zeolites "by an ion exchange and by an immersion" (column 3, lines 11–17 and 22–30) to produce $NO_X$-reducing catalysts. Durability is improved by using at least 1.3 parts platinum. The platinum group metals are used separately in the following amounts per 100 parts by weight ("parts") of zeolite; platinum, 1.3 parts or more; palladium, 0.8 parts or more; or rhodium, 0.7 parts or more. In terms of the weight of the metals as a percent of the combined weight of the metal plus zeolite, these quantities correspond to 1.28% platinum, 0.79% palladium, and 0.7% rhodium. The graphs of FIGS. 1–6 of Ishibashi et al plot $NO_X$ conversion against platinum group metal loadings and show data points which appear to start at about 0.2 parts of platinum group metal, about 0.2%. However, the data show that the claimed amount of at least about 1.28% of platinum must be used to attain satisfactory $NO_X$ conversion. Preferred zeolites have a pore size of 5 to 10 Angstroms.

U.S. Pat. No. 4,206,087 to Keith et al, dated Jun. 3, 1980, teaches that a $NO_X$-reducing catalyst may comprise 0.01 to 4 weight percent, preferably 0.03 to 1 weight percent platinum group metals dispersed on an inorganic support material that may comprise an alumino-silicate.

U.S. Pat. No. 5,041,272 to Tamura et al, dated Aug. 20, 1991, teaches that hydrogen form zeolites are catalytically effective $NO_X$-reducing catalyst materials at 400° C. (see Example 1, column 3).

SUMMARY OF THE INVENTION

The present invention provides a method for reducing gaseous nitrogen oxides present in a gas stream by reaction with reductant species. The method comprises flowing the gas stream under lean $NO_X$-reducing conditions in contact with a catalytic material comprising a catalytically effective amount of a catalyst species incorporated into a reductant storage material, and providing an intermittent supply of reductant to the gas stream.

According to one aspect of the invention, the catalytic species may comprise a platinum group metal and the reductant storage material may comprise a molecular sieve material. The molecular sieve material may be selected from the group consisting of ZSM-5, Y-zeolite, mordenite, Beta-zeolite, omega-zeolite, rho-zeolite, borosilicates, and iron silicates. It is preferred that the molecular sieve material has an average pore diameter of not greater than about 10 Angstroms. Thus, ZSM-5 is a preferred reductant storage material.

According to another aspect of the invention, the step of providing an intermittent supply of reductant species may comprise pulsing hydrocarbons into the gas stream in amounts that yield, during the hydrocarbon-on modes established thereby, a ratio of carbon atoms to $NO_X$ molecules in the gas stream in the range of from about 0.5:1 to 20:1.

In particular embodiments, the catalytic material comprises less than about 2.0% platinum by weight of zeolite plus platinum, typically less than about 0.5% platinum, e.g., from about 0.025% to 0.2%.

The invention also relates to a catalytic material useful for the reduction of $NO_X$. The material comprises a porous molecular sieve material having a catalytic species incorporated therein wherein the catalytic species is concentrated at the inlets of the molecular sieve material pores or near the molecular sieve material surface. The invention also relates to two methods for making such catalytic materials. The first method comprises incorporating a catalytically effective amount of a catalytic species into a template-bearing molecular sieve material, and then calcining the molecular sieve material, whereby the template is removed from the molecular sieve material after the catalytic species is incorporated therein. The second method comprises depositing a blocking agent onto a molecular sieve material, incorporating a catalytically effective amount of a catalytic species into the molecular sieve material having the blocking agent thereon, and then calcining the molecular sieve material, whereby the blocking agent is removed from the molecular sieve material after the catalytic species is incorporated therein.

Other aspects of the present invention are disclosed in the following description.

As used here and in the claims, the term "platinum group metal" means and includes platinum, palladium, rhodium, iridium, ruthenium and osmium.

DETAILED DESCRIPTION OF THE INVENTION AND PREFERRED EMBODIMENTS THEREOF

Figure 1:
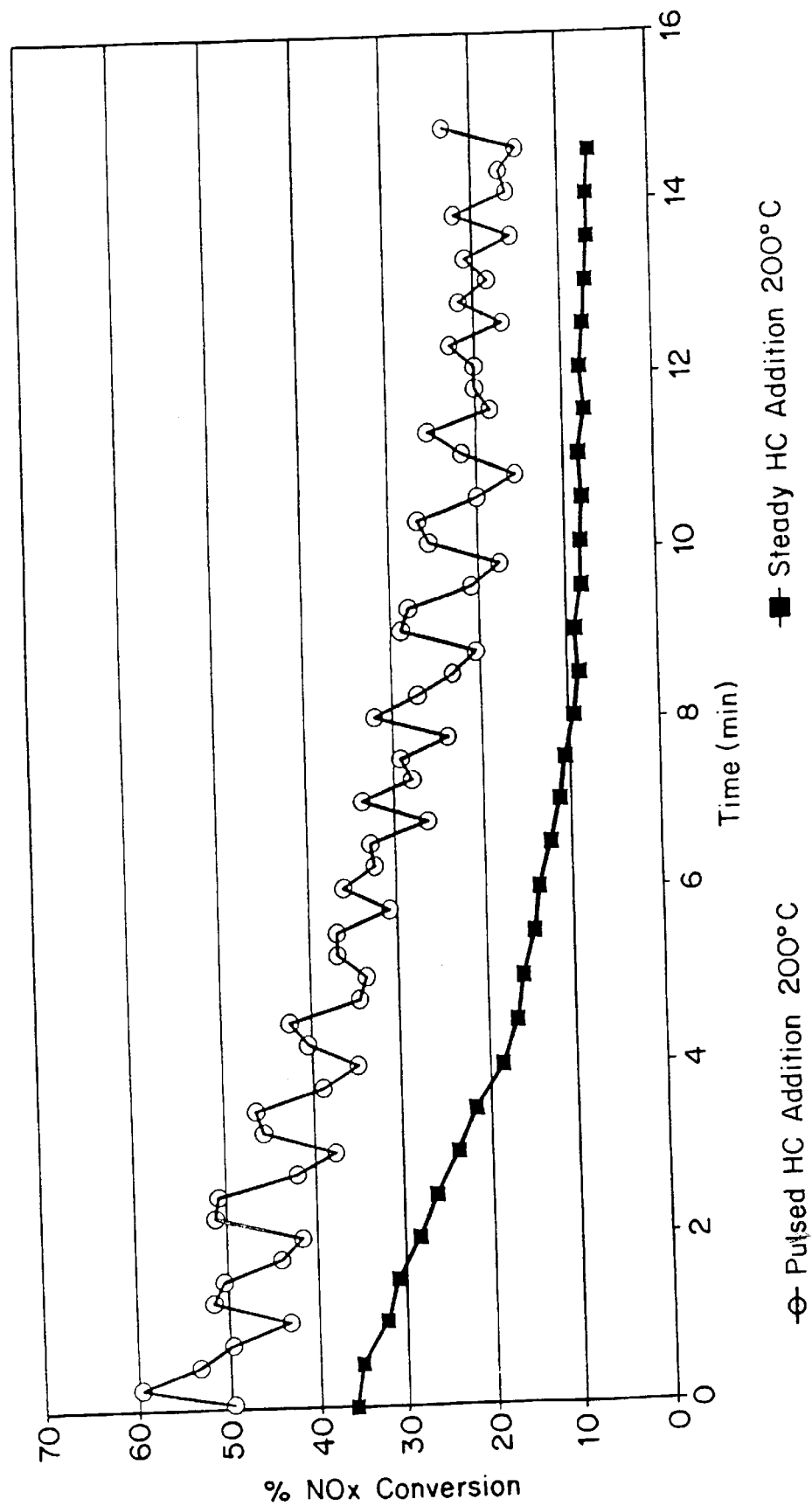
FIGS. 1–16 are plots showing $NO_X$ conversion and $N_2O$ formation rates for the various catalytic materials described in the Examples.

The present invention pertains to methods and materials for attaining improved reduction of oxides of nitrogen ($NO_X$) with hydrocarbon reductants in a gas stream produced under lean conditions, i.e., in a gas stream containing oxygen in excess of the stoichiometric quantity required to oxidize the hydrocarbons, partially burned hydrocarbons and carbon monoxide in the gas stream. The $NO_X$ reduction reaction is catalyzed by a catalytic material generally comprising a catalytic species, e.g., one or more platinum group metals, incorporated into a reductant storage material, i.e., a molecular sieve material, preferably an acid-form zeolite, which can store reductant from the gas stream and/or catalytically produce and store derivatives therefrom that are capable of reducing $NO_X$ in the gas stream. The derivatives may be more reactive with $NO_X$ than the reductants in the gas stream. The reductants in the gas stream and the reductant derivatives formed on the molecular sieve material are referred to collectively herein as "reductant species".

A method aspect of the invention involves providing gaseous or liquid reductant in the gas stream intermittently rather than continuously. For example, a hydrocarbon reductant such as propylene or diesel fuel may be provided to the gas stream in alternating intervals, e.g., it may be added for a designated time interval followed by an interval without the addition of the hydrocarbon reductant. Stated differently, the reductant may be pulsed "on" (establishing a "hydrocarbon-on" mode), then "off" (establishing a "hydrocarbon-off" mode) and so on. The hydrocarbon-on and hydrocarbon-off modes may be, but need not be, of equal duration. The intermittent addition of reductant such as hydrocarbons to the $NO_X$-containing gas stream is sometimes referred to herein as "pulsing". The hydrocarbon reductant may be pulsed on by injecting reductant into the gas stream or by appropriately adjusting the fuel/oxygen ratio of the combustion mixture from which the gas stream is derived. In hydrocarbon-on modes, hydrocarbon reductant is provided to the lean gas stream in an amount that provides a ratio of carbon atoms to $NO_X$ molecules in the range of about 0.5:1 to 20:1, e.g., from about 1:1 to 8:1. During the hydrocarbon-off modes, reductant is present in the gas stream in smaller amounts, or not at all, to create a reductant deficit in the gas stream that allows reductant species stored in the reductant storage material to be consumed for the reduction of $NO_X$.

Without wishing to be bound by any particular theory, the improved catalytic activity attained by pulsing reductant in the gas stream is believed to be due to the storage by the catalytic material of reductant species while the reductant is pulsed on. The stored reductant species are then available for $NO_X$ reduction when the reductant in the gas stream is pulsed off. In addition, by allowing stored reductant species to react with $NO_X$, the catalytic material is "cleaned", exposing catalytic sites that would otherwise be made inaccessible to $NO_X$ and/or gaseous reactant species due to the accumulation of stored reductant species thereon. Further, allowing stored reductant species to react with $NO_X$ diminishes the reductant requirement for the reduction process. Thus, intermittently supplying the reductant enhances catalytic activity of the catalytic material and reduces the quantity of reductant consumed in the $NO_X$ reduction process, i.e., it lowers the reductant cost of the reduction process, relative to a constant supply process. As is illustratated in the Examples below, the advantage of reductant pulsing is, in part, temperature-dependent; for a given catalytic material being used under given process conditions, there is a temperature above which the advantages of reductant pulsing are no longer obtained. This is believed to be due to the inability of the storage material to effectively store reductant species, which may then be lost by desorption and/or oxidation at or above that temperature even when the reductant is pulsed on. The upper temperature limit will vary depending on the particular catalytic material, the particular reductant species added to the gas stream and the operating conditions under which $NO_X$ reduction is carried out. For a ZSM-5-based catalytic material containing 0.1% to 1.0% platinum subjected to hydrocarbon pulsing with propylene as the reductant in a gas stream flowing at 25,000/hr, the upper temperature limit for reductant storage falls in the range of about 250° C.–300° C.

Molecular sieve materials such as zeolites, borosilcates and iron silicates are all believed to be suitable storage materials for the preparation of catalytic material in accordance with the invention. Preferably, the molecular sieve material has an average pore size in the range of about 4 to 10 Angstroms, since this is believed to limit the size of platinum group metal crystallites that can form during use of the catalyst. Since the agglomeration of the platinum group metal into large crystallites diminishes catalytic activity, the small average pore size is believed to improve catalyst durability.

While the reductant pulsing method described herein can be practiced using conventional molecular sieve-based catalytic materials, there is an aspect of the present invention that relates to a method of preparing novel molecular sieve-based catalytic materials. According to this method, a molecular sieve material made with the use of an organic template such as a tetraalkylammonium hydroxide is not calcined between the time it is formed and the time the catalytic species, e.g., platinum, is incorporated therein, as would conventionally be done to remove the organic template. Thus, the platinum (or other catalytic species) is incorporated into a template-bearing molecular sieve material. Without wishing to be bound by any particular theory, it is believed that having the template within the molecular sieve material when the platinum is incorporated therein may hinder the platinum from being deposited within the molecular sieve material pores, and thus guide the platinum to sites that are more accessible to $NO_X$ molecules than the platinum would occupy had the molecular sieve material been pre-calcined. The sites where the platinum is incorporated into a template-bearing molecular sieve material are believed to be concentrated about the inlets of the pores or near the surface of the molecular sieve material. In contrast, platinum would be incorporated throughout a non-template-bearing molecular sieve material, including in the interior of the pores, which are less accessible to $NO_X$ and reductant in the gas stream than the pore inlets or the molecular sieve material surface. Further, the calcination of the molecular sieve material after the incorporation therein of the platinum group metal is believed to provide the finished catalytic material with more catalytically active acid sites than are formed in molecular sieve materials that are pre-calcined.

Another way that platinum group metal can be guided to more strategic sites is to add a blocking agent to the molecular sieve material before incorporating the catalytic species therein. The blocking agent is typically a bulky organo-amine such as a tetraalkylammonium hydroxide that can obstruct the pores of the molecular sieve material while the catalytic species, e.g., platinum, is incorporated therein and that can be removed thereafter by calcination. The blocking agent can be applied to a molecular sieve material by wetting the molecular sieve material with a solution containing the blocking agent and then drying the molecular sieve material. The platinum (or other catalytic species) is then incorporated into the molecular sieve material and concentrated on the molecular sieve material surface and at its pore inlets. Subsequent calcination burns off the blocking agent while fixing the platinum to the molecular sieve material.

The practice of the reductant pulsing method of the present invention is not limited, however, to the use of catalytic material prepared using template- or blocking agent-bearing molecular sieve material. Rather, reductant pulsing can be practiced with molecular sieve materialbased catalytic materials prepared in a conventional manner, i.e., using molecular sieve materials that are calcined to remove the organic template before the catalytic species are incorporated therein.

Yet another aspect of the invention relates to novel platinum-containing zeolite materials that are effective for $NO_X$ reduction, the materials comprising less than about 0.5% platinum by weight. As will be demonstrated below, zeolite materials comprising as little as 0.025% platinum, more typically 0.025% to 0.1% or to 0.2% platinun by weight of platinum plus zeolite, are catalytically effective for such $NO_X$ reduction.

A platinum group metal catalytic species can be incorporated in the reductant storage material in any convenient manner. In the case of zeolite reductant storage material, the platinum group metal, e.g., platinum, can be incorporated therein by impregnation or by ion exchange. Impregnation is typically accomplished by wetting the zeolite material with a solution containing a platinum salt dissolved therein, and precipitating the platinum onto the zeolite. For ion exchange, the zeolite material is soaked or flushed with a solution of one or more suitable platinum group metal compounds for a period of time and otherwise under conditions to cause the platinum group metal cations to displace other cations (such as $Na^+$, $NH_4^+$, $H^+$, etc.) present in the zeolite material, and thus become incorporated into the zeolite material.

A catalytic material employed for gas phase $NO_X$ reduction in accordance with the present invention is rendered in a form in which the gas stream can come into contact with the material under lean $NO_X$-reducing conditions. Typically, this involves depositing the catalytic material as a coating on a carrier which has a physical structure that allows the gas stream to flow therethrough in contact with the catalytic material at a temperature sufficient to support the reduction reaction, e.g., at least about 150° C. The preferred carriers comprise ceramic-like materials such as cordierite, α-alumina, mullite, and the like, while others may comprise refractory metals such as stainless steel. One typical kind of carrier comprises a body of cylindrical configuration (which in cross section may be circular, oval or polygonal) having two end faces and a plurality of fine, substantially parallel gas flow passages extending therethrough and connecting the end faces of the carrier to provide a "flow through" type of carrier. Such carriers may contain up to about 700 or more flow channels ("cells") per square inch of cross-sectional flow area, although carriers having far fewer cells per square inch ("cpsi") may also be useful. For example, typical carriers have from about 200 to 400 cpsi.

The catalytic material can be deposited on the carrier by disposing the material in an aqueous slurry and applying the slurry as a washcoat onto the carrier. A binder material such as silica sol or alumina sol may be added to the slurry to enhance the adhesion of the catalytic material to the carrier surface.

The superior catalytic performance attainable by the hydrocarbon pulsing method of the present invention is illustrated in Example 1. The unexpected advantage of incorporating catalytic material into an uncalcined, template-bearing molecular sieve material, rather than into a pre-calcined molecular sieve material, is illustrated in Example 2. The effectiveness of a zeolite-based catalytic material comprising as little as 0.025% platinum is shown in Example 3. Example 4 illustrates that the surprising advantage of the hydrocarbon pulsing technique of the present invention may be attained even after a conventional steady state process has led to a decrease in catalytic activity, and Example 5 illustrates that zeolite-based catalytic material having a low platinum loading exhibits better selectivity for $NO_X$ reduction over the unwanted production of $N_2O$ and $SO_3$ relative to high platinum loading, especially at low temperatures. Example 6 shows that the improved selectivity shown in Example 5 is also attainable in the reductant pulsing method of the invention. The molecular sieve materials used in Examples 1 through 6 are all acid-form zeolites having a silica:alumina ratio in the range of 40:1 to 50:1. Example 7 shows that catalytic materials comprising acid form zeolites exhibit unexpectedly superior activity relative to sodium form zeolites.

EXAMPLE 1

A. PREPARATION OF CATALYST MEMBER E-1

A 0.2% platinum-ZSM-5 catalytic material in accordance with the present invention was prepared by dissolving 0.4 grams of $Pt(NH_3)_4Cl_2$ in 600 ml water. The pH of the solution was increased from 5.4 to 10.4 by the addition of an ammonium hydroxide solution. One hundred grams of uncalcined, i.e., template-bearing ZSM-5 material, was added to the solution, which was stirred for about five hours at about 45° C. to exchange the platinum cations into the ZSM-5. The solution was then filtered and washed with one liter of water and disposed in an aqueous slurry having 33 percent solids content. The slurry was coated onto a 400 cpsi cylindrical honeycomb carrier measuring 1.5 inches in diameter and 3 inches in length, at a loading of about 2 grams per cubic inch. The coated carrier was dried at 100° C. and calcined at 550° C. for two hours, which is sufficient to remove the template from the zeolite. The resulting catalyst member is designated E-1.

B. TEST PROCEDURES A AND B

Catalyst member E-1 was tested by heating the catalyst member to about 100° C. in air. A feed stream comprising 250 ppm NO, 333 ppm propylene (equivalent to 1000 ppm $C_1$), 10 percent $H_2O$, 10 percent $O_2$, 50 ppm $SO_2$ and balance nitrogen, giving a $C_1:NO_X$ ratio of 4:1, was flowed through the catalyst member at a space velocity of 25,000/hr, and the temperature of the gas stream was kept constant at about 200° C. (±5° C.). This steady-state test procedure is referred to herein as Test Procedure A. Catalyst member E-1 was also subjected to a reductant pulsing test using a gas stream like that of Test Procedure A except that the propylene was pulsed on to 333 ppm and then pulsed off for alternating thirty-second intervals. This constant temperature, hydrocarbon pulsing test procedure is referred to herein as Test Procedure B. The rates of catalytic conversion of $NO_X$ were monitored during both tests and are plotted in FIG. 1. The hydrocarbon pulsing results shown in FIG. 1 illustrate that while $NO_X$ reduction increased substantially during the hydrocarbon-on modes, there was a significant degree of $NO_X$ conversion at 200° C. even during the hydrocarbon-off modes. Since the hydrocarbons are believed to be the reducing agent for the $NO_X$, the $NO_X$ conversion activity during the hydrocarbon-off mode is believed to be due to the reaction with $NO_X$ of hydrocarbons and hydrocarbon derivatives, i.e., reductant species, stored on the zeolite component of the catalytic material.

C. ADDITIONAL TESTS

Figure 2:
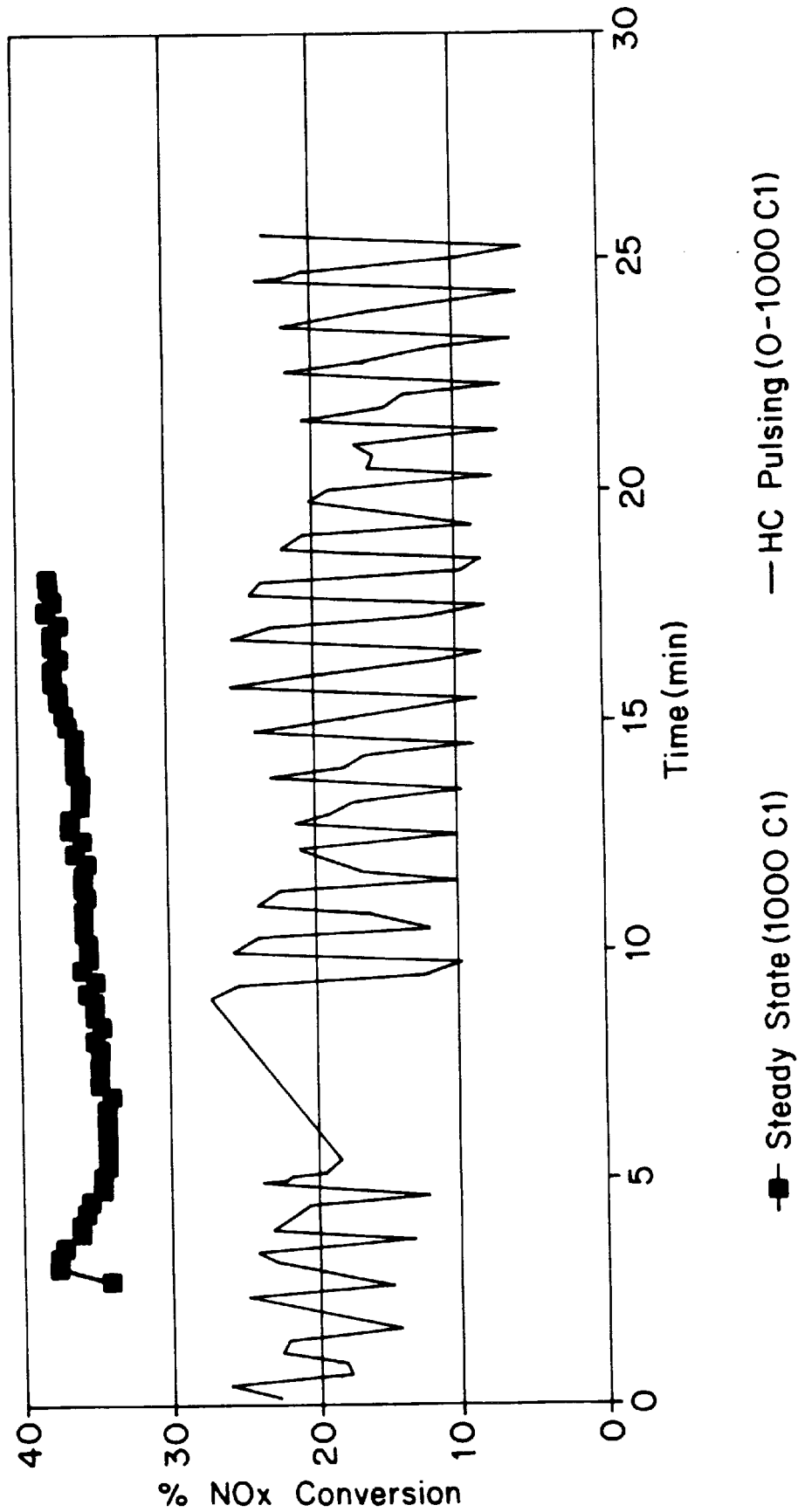

Catalyst member E-1 was tested again at 250° C., once under the steady state conditions of Test Procedure A and under the hydrocarbon pulsing conditions of Test Procedure B. The $NO_X$ conversion rates are plotted in FIG. 2. The plots show that at 250° C., the catalytic material performed better under steady state conditions than under hydrocarbon pulsing conditions. This is believed to be due to the inability of the catalytic material to store the hydrocarbon reductant at the test temperature.

D. TEST PROCEDURE C

Figure 3:
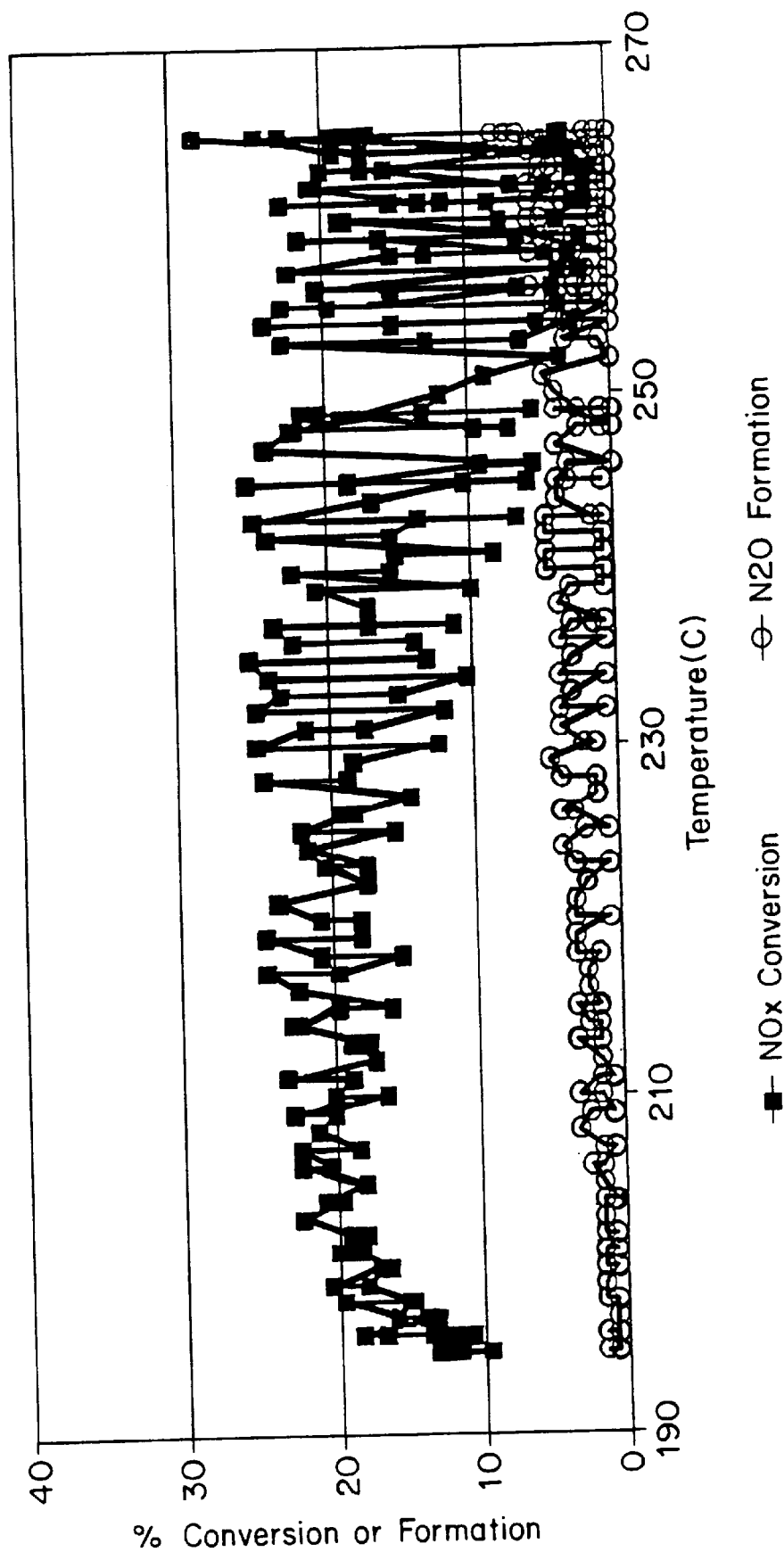

Test Procedure B was repeated on catalyst member E-1 except that the temperature of the gas stream started at about 190° C. and was increased to about 265° C. at a rate of 10° C. per minute. This rising-temperature hydrocarbon pulsing test procedure is referred to herein as Test Procedure C. The results are plotted in FIG. 3 which shows, as the temperature approached 250° C., $NO_X$ conversion activity in the hydrocarbon-off modes fell to unfavorable rates. This result confirms the observation of Example 1 that for the described catalytic material working under the previously described conditions, hydrocarbon pulsing yields improved performance at temperatures below about 250° C.

EXAMPLE 2

A. PREPARATION OF CATALYST MEMBER C-1

A 0.2% platinum-ZSM-5 catalytic material was prepared by first calcining 1000 grams of ZSM-5 in air in a muffle furnace at 600° C. for two hours to remove organic templates. The temperature, was increased from ambient in 50° C. intervals over a period of five hours to attain the 600° C. calcination temperature, which was maintained for two hours. After calcination, platinum cations were exchanged into 100 grams of the zeolite material in a manner similar to that described in Example 1. The resulting catalytic material comprised about 0.2% by weight platinum. The catalytic material was made into a slurry and was coated onto a honeycomb carrier. The resulting catalyst member is designated C-1.

B. TEST

Figure 4:
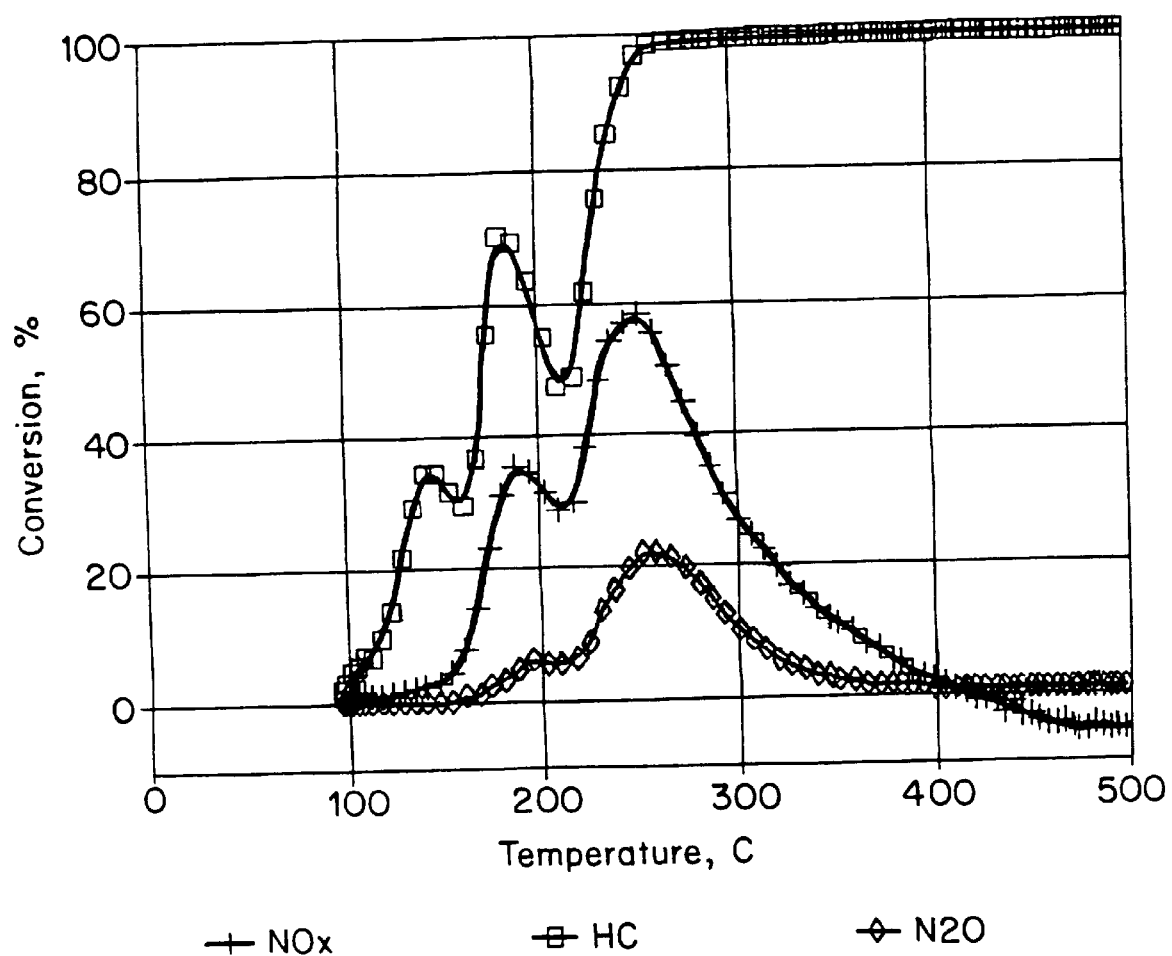
Figure 5:
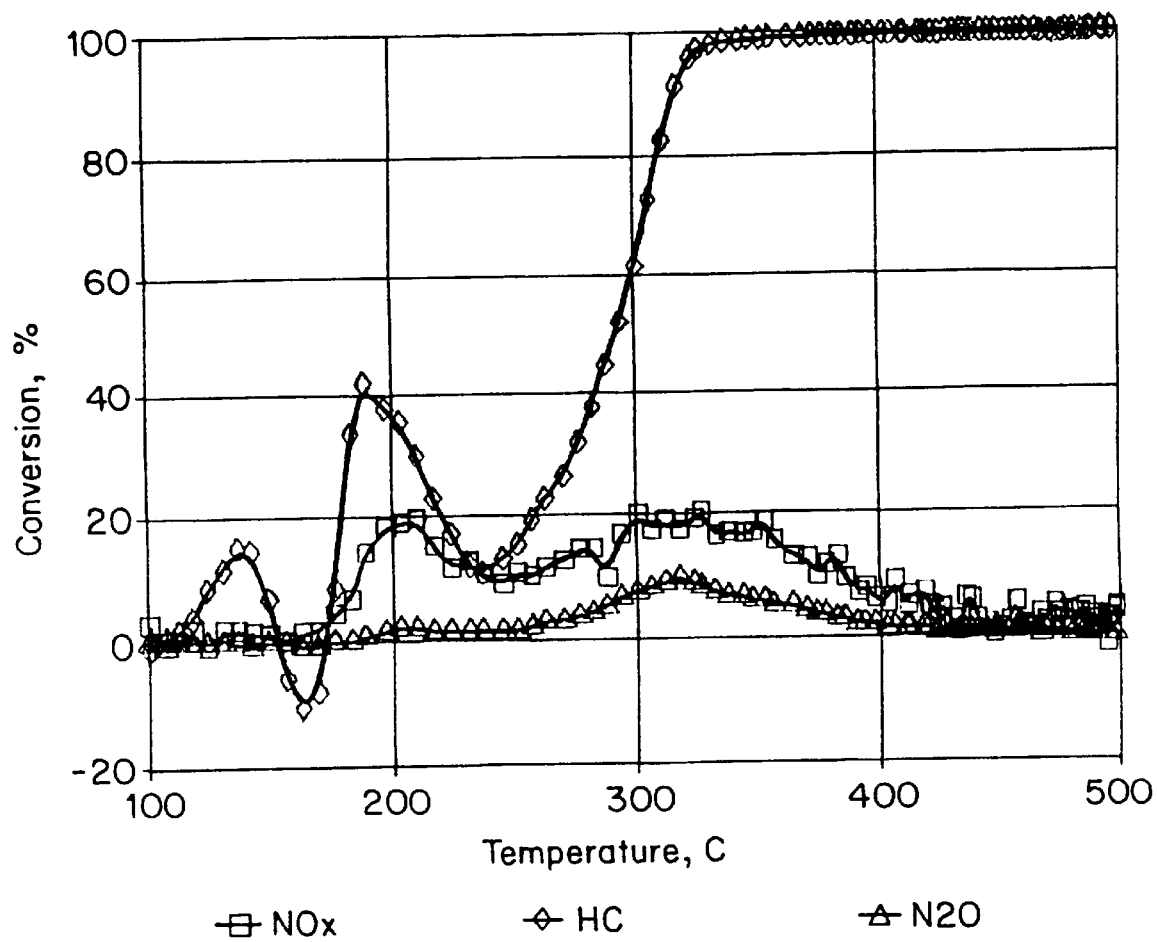

Catalyst members E-1 and C-1 were both subjected to a test procedure similar to Test Procedure A except that the temperature, which started at about 100° C., was increased at a rate of 10° C. per minute. This steady feed stream, increasing temperature test procedure is referred to herein as Test Procedure D. The $NO_X$ and hydrocarbon conversion rates and the $N_2O$ formation rates were monitored and are plotted in FIG. 4 and FIG. 5, respectively. A comparison of FIGS. 4 and 5 show that the catalytic material of catalyst member E-1, which was prepared from uncalcined, template-containing ZSM-5, gave surprisingly superior performance, including a conversion rate of 50%–60% in the temperature range of 200° C.–350° C., relative to catalyst member C-1, which was prepared from pre-calcined zeolite material from which the template was removed prior to the incorporation of platinum and which yielded less than 20% $NO_X$ conversion in the temperature range 200° C.–350° C.

EXAMPLE 3

A. PREPARATION OF CATALYST MEMBER E-2

A 0.025% Pt-ZSM-5 catalytic material was prepared by adding 0.08 grams of $Pt(NH_3)_4Cl_2$ to 750 ml of deionized water. The pH of this solution was adjusted to pH 10.5 using a dilute $NH_4OH$ solution. To this Pt solution, 150 grams uncalcined, template-containing ZSM-5 was added. The resulting slurry was stirred for 3 hours at 50° C. The Pt-ZSM-5 catalytic material, which contained 0.025% Pt by weight based on the combined weight of zeolite plus platinum, was then filtered, washed with 500 ml of deionized water and dried overnight on a buchner funnel.

Ninety grams of the dried Pt-ZSM-5 powder was added to 120 grams of deionized water and mixed in a blender to produce a washcoat slurry. A 400 cpsi cordierite honeycomb was coated with this slurry to give a loading of 1.8 $g/in^3$ of washcoat material after drying at 110° C. and calcination of 2 hours at 550° C. The resulting catalyst member is designated E-2.

B. PREPARATION OF CATALYST MEMBER E-3

A 0.05% Pt-ZSM-5 catalytic material was prepared as described above in Example 3, except that the initial platinum solution was prepared by adding 0.15 grams of $Pt(NH_3)_4Cl_2$ to 750 ml deionized water. The resulting catalyst member is designated E-3.

C. TEST

Figure 6:
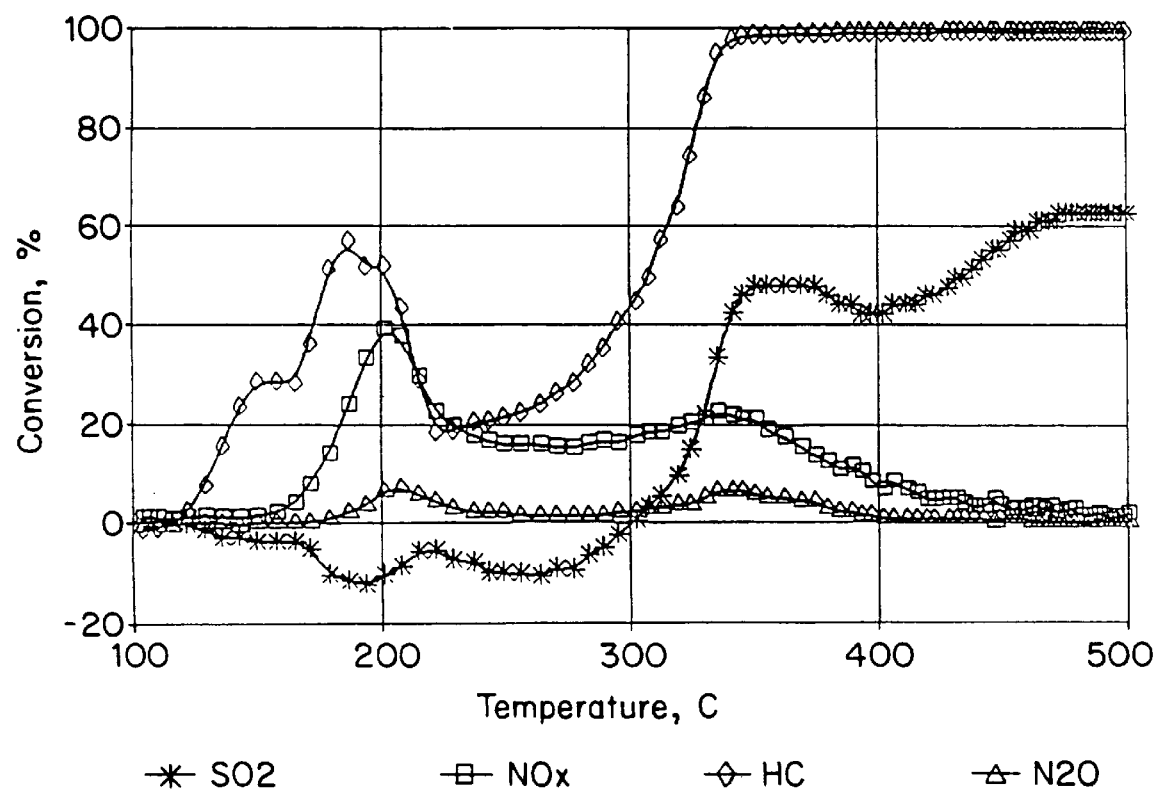
Figure 7:
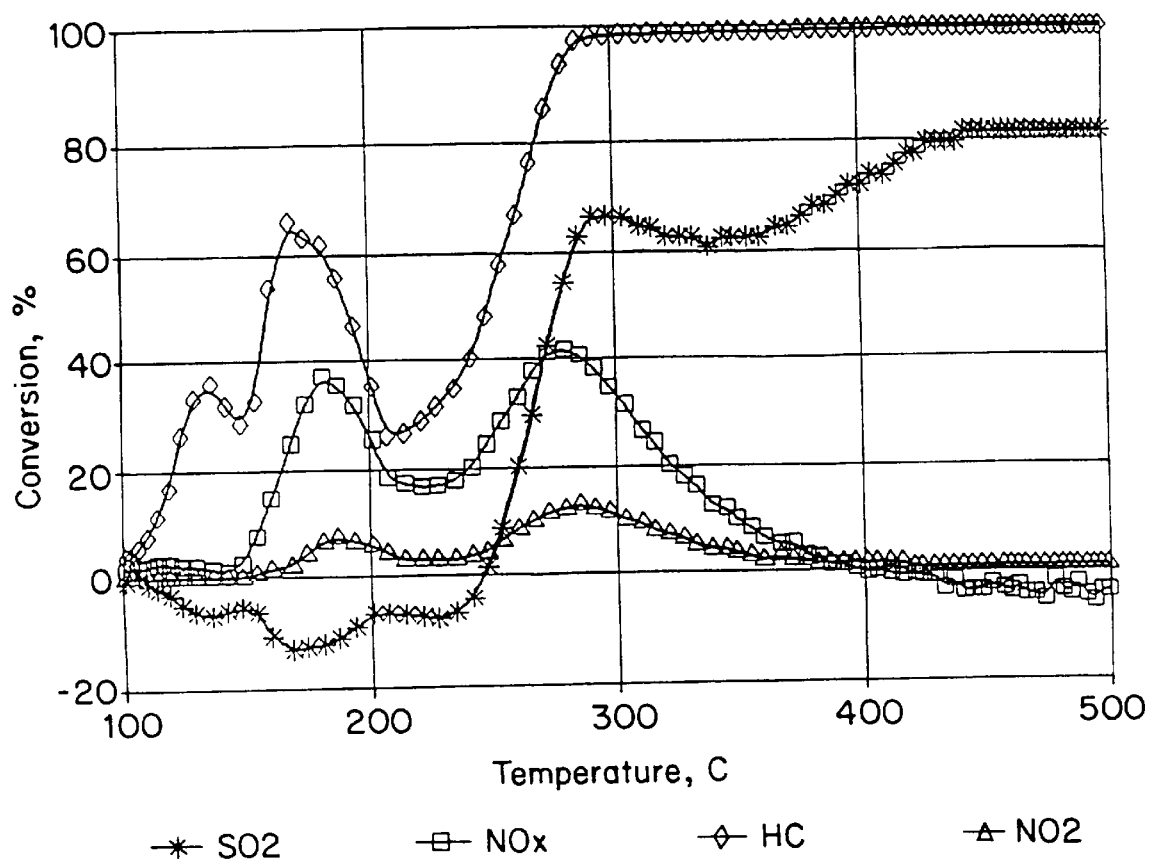

Catalyst members E-2 and E-3 were tested under steady feed, increasing temperature conditions according to Test Procedure D, and the results are set forth in FIGS. 6 and 7, respectively. These Figures show that catalytic materials having as little as 0.025% and 0.05% platinum ion-exchanged into the zeolite are effective for $NO_X$ reduction at low temperature without producing significant quantities of $N_2O$ or $SO_3$.

EXAMPLE 4

A. PREPARATION OF CATALYST MEMBER E-4.

A catalytic material comprising 0.1 percent ruthenium made from $Ru(NH_3)_4Cl_2$ and 0.2 percent platinum incorporated by ion exchange into ZSM-5 zeolite was prepared as generally described above in Example 1. The resulting catalyst member is designated E-4.

B. TEST

Figure 8:
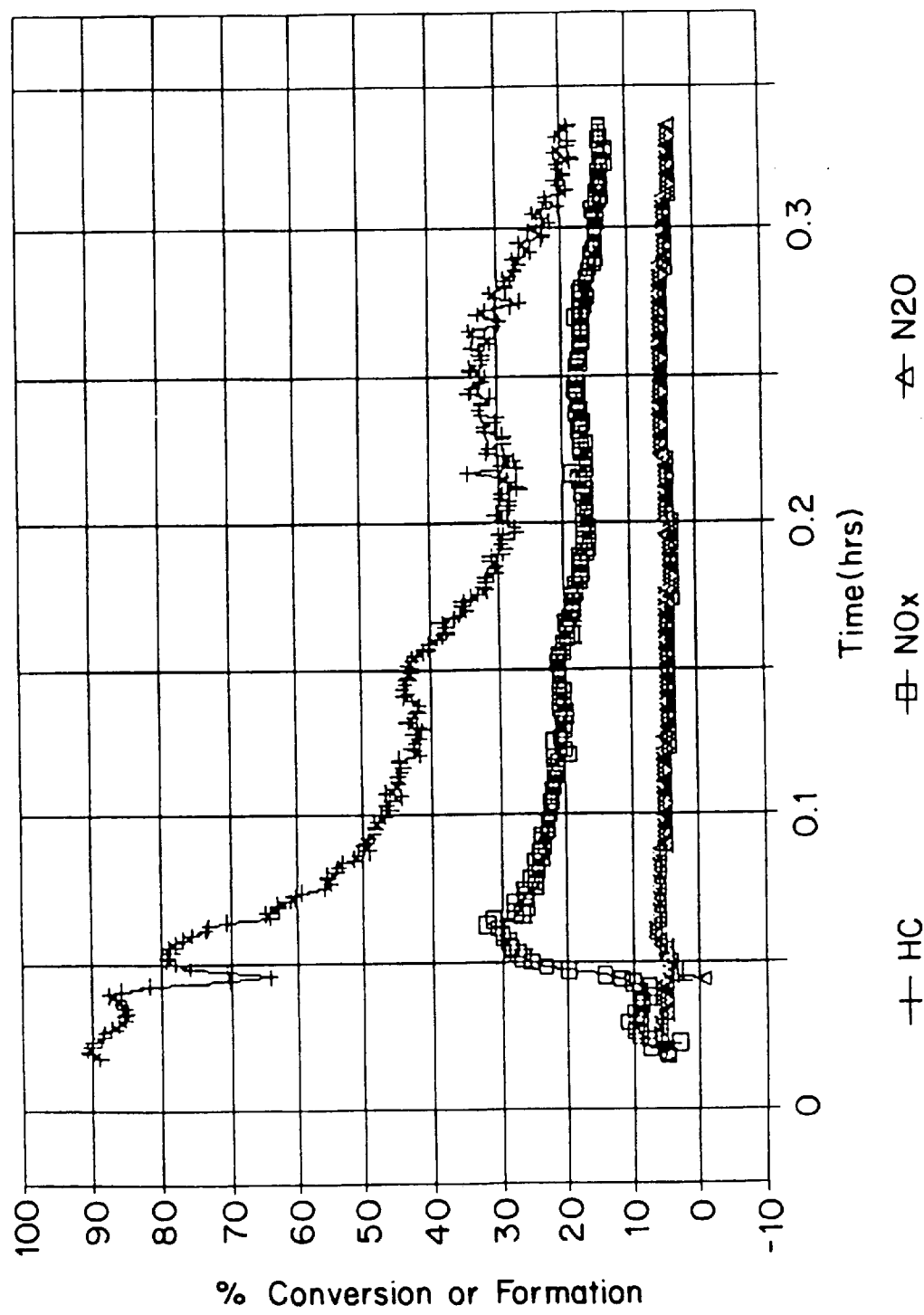

Catalyst member E-4 was subjected to three separate series of tests. A first steady-state test similar to Test Procedure A except for the temperature, was performed. Catalytic activity was observed at 215° C., 270° C. and 315° C. after fifteen minutes TOS. The observed results of $NO_X$ conversion and $N_2O$ formation are summarized below in TABLE I. A more complete presentation of the conversion data for the test at 215° C. is provided by FIG. 8.

TABLE I

TYPE B TEST

| TEMPERATURE (° C.) ± 5° C. | % $NO_x$ CONVERSION AFTER 15 MIN TOS | % $N_2O$ YIELD AFTER 15 MIN TOS |
|---|---|---|
| 215° C. | 14 | 4 |
| 270° C. | 32 | 19 |
| 315° C. | 19 | 7 |

Figure 9:
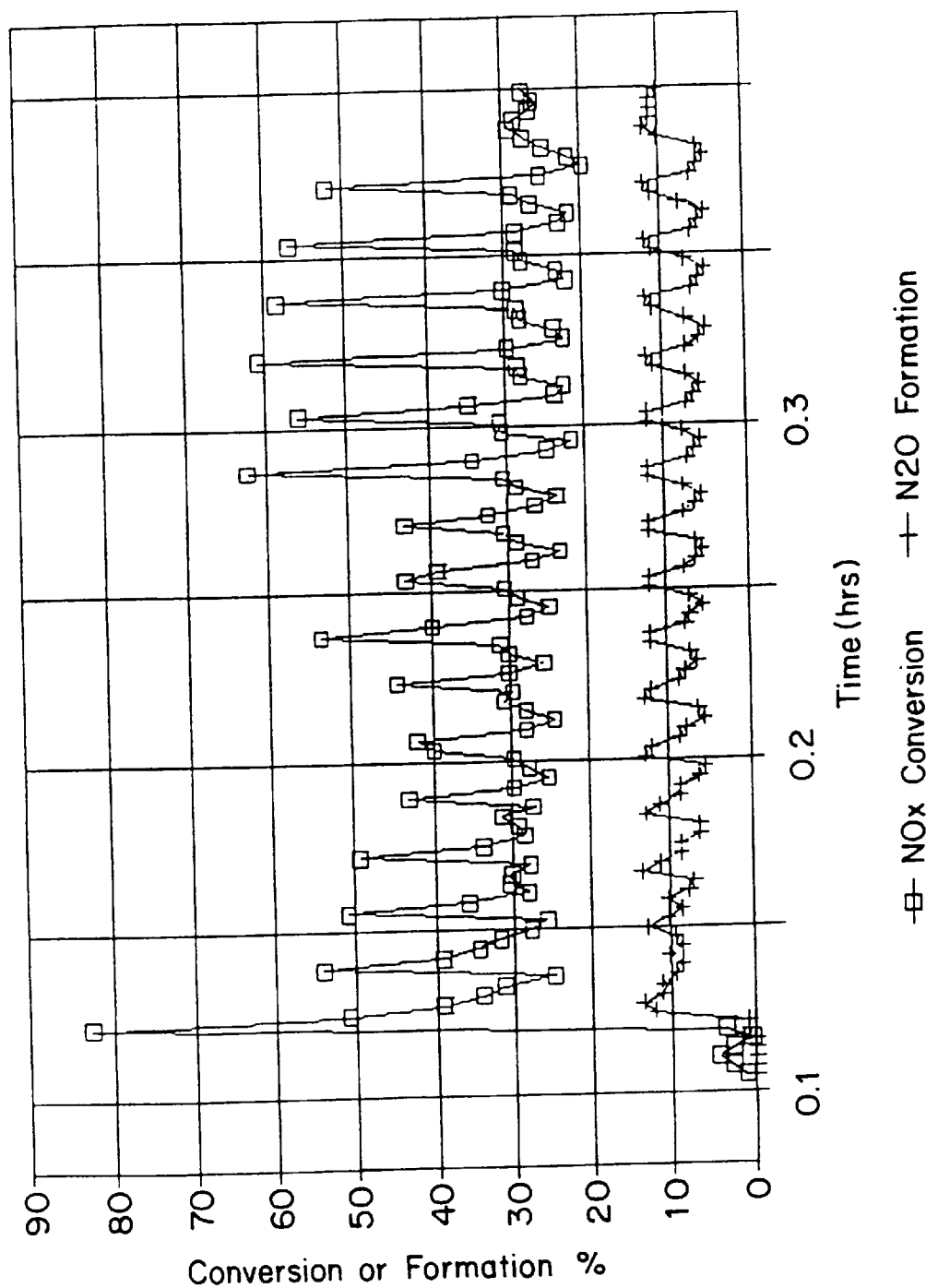

After the 15-minute steady state tests, catalyst member E-4 was exposed to 250 ppm NO, 10 percent $O_2$, 10 percent $H_2O$ and 50 ppm $SO_2$ for several minutes at 215° C. and a space velocity of 25,000/hr for about three to five minutes to allow the catalyst activity to stabilize. Then, propylene was added intermittently in accordance with Test Procedure B. The results are plotted in FIG. 9, which shows that pulsing yields superior conversion rates relative to the steady state test, even for a catalytic material that has previously been subjected to steady state conditions.

After the hydrocarbon pulsing test, catalyst member E-4 was heated to 270° C. in a gas mixture comprising 10 percent $O_2$ and 90 percent $N_2$. At that temperature, the catalyst produced 40 ppm $CO_2$, which is believed to be the result of the combustion of carbonaceous material stored by the catalyst member during the previous test. After about five minutes at 270° C., the catalyst member was stabilized and the feed stream was supplemented with 277 ppm NO, 50 ppm $SO_2$, and 10 percent $H_2O$. Upon the introduction of the NO, $CO_2$ production increased sharply to about 400 ppm, accompanied by about 55 ppm $NO_X$ reduction. After about ten minutes $NO_X$ reduction fell to about 10 percent, i.e., a removal of 28 ppm $NO_X$ from the gas stream, and $CO_2$ production fell to about 200 ppm. This result shows that at 270° C. this catalyst is more effective at catalyzing the reaction between $NO_X$ and hydrocarbons than between oxygen and hydrocarbons. This selectivity is advantageous in that the hydrocarbons are consumed efficiently, reducing the supply required to support $NO_X$ reduction.

Figure 10:
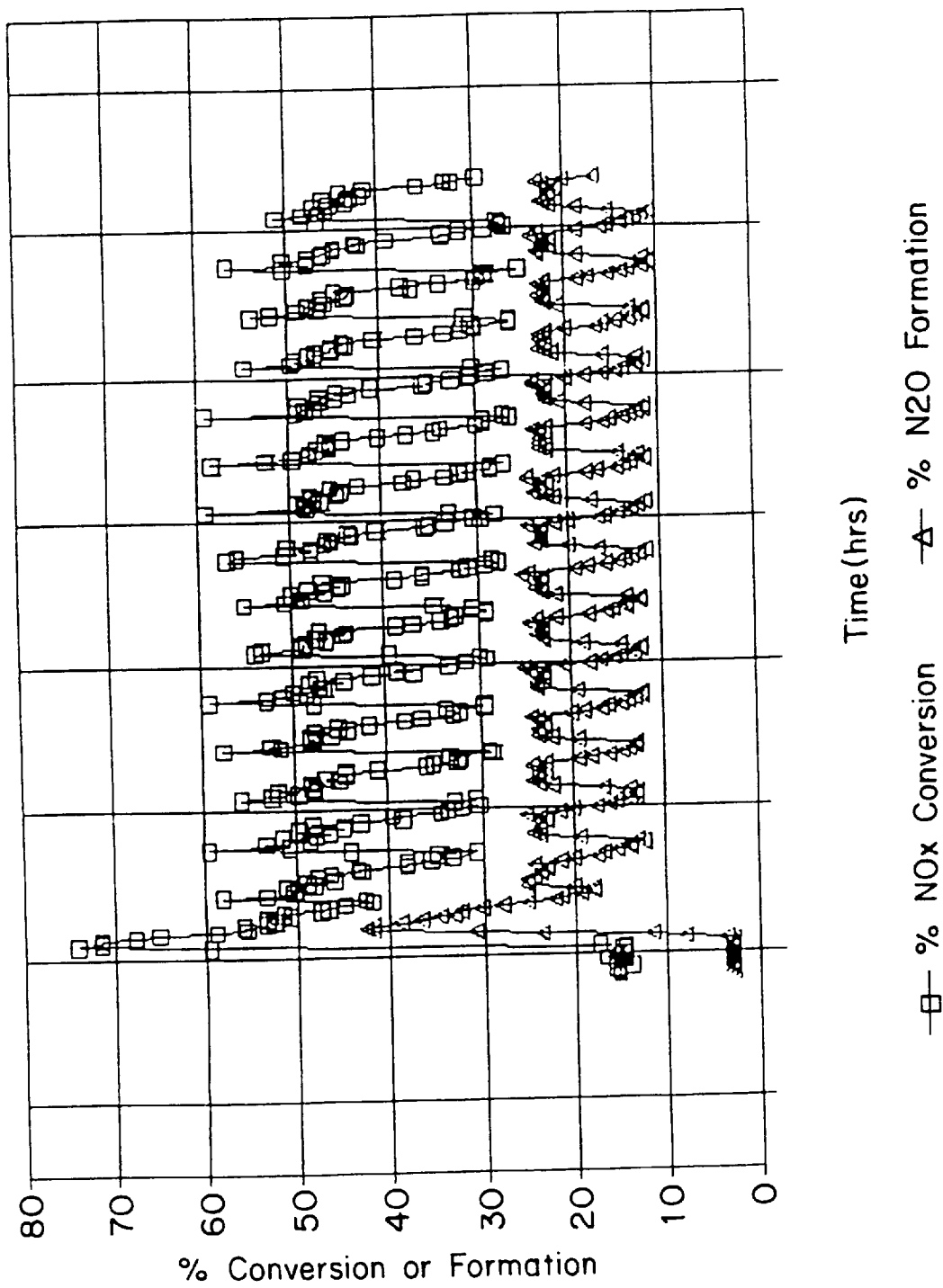

After conditions were stabilized at 270° C., hydrocarbon pulsing was initiated once again to produce thirty-second hydrocarbon-on intervals followed by thirty-second hydrocarbon-off intervals, for fifteen minutes. The catalyst conversion activity was monitored and the results are set forth in FIG. 10. The results are similar to the test at 215° C. in that $NO_X$ conversion and $N_2O$ formation peak at the onset of each hydrocarbon-on mode and reach a non-zero minimum during the hydrocarbon-off modes. The maximum and minimum $NO_X$ conversion rates and $N_2O$ formation rates at the 215° C. and 270° C. tests were recorded after fifteen minutes time on stream and the results are set forth below in TABLE II.

TABLE II

| TEMPERATURE (° C.) ± 5° C. | % $NO_x$ CONVERSION AFTER 15 MIN TOS | | % $N_2O$ YIELD AFTER 15 MIN TOS | |
|---|---|---|---|---|
| | MAXIMUM | MINIMUM | MAXIMUM | MINIMUM |
| 215° C. | 52 | 20 | 12 | 5 |
| 270° C. | 57 | 26 | 22 | 12 |

The data of TABLE II show, by comparison to those of TABLE I, that the conversion performance of zeolite-based catalytic materials improves, i.e., provides a high maximum $NO_X$ conversion rate, when the reductant in the gas stream is "pulsed", i.e., added to the gas stream intermittently, relative to when the reductant level is constant.

EXAMPLE 5

A. PREPARATION OF CATALYST MEMBER E-5

A 0.1% Pt-impregnated ZSM-5 catalytic material was prepared by diluting 0.84 grams of an aqueous platinum amine hydroxide solution comprising 17.91% platinum by weight in 210 ml of water for impregnation into a zeolite storage material. One hundred fifty grams of ZSM-5 was added to the diluted solution, followed by 7.5 ml of acetic acid. The mixture was ball milled for 16 hours. The resulting slurry was then used to coat a cylindrical substrate (400 cpsi) with 1.5" diameter×3.0" length. The washcoat loading was about 2 g/in$^3$. The coated substrate was then dried at 100° C. and calcined at 550° C. for 2 hours. The resulting catalyst member is designated E-5.

B. PREPARATION OF CATALYST MEMBER C-2

A comparative 2% Pt on ZSM-5 catalytic material was prepared by impregnating 200 grams of ZSM-5 with 22.8 grams of 17.91% platinum amine hydroxide solution dissolved in 77.2 grams of deionized water. After mixing for one hour, 10 ml of acetic acid was added. The platinum-impregnated zeolite material was then dried at 100° C. and calcined at 550° C. for 2 hours. The finished catalytic material contained 2% Pt based on the combined weight of zeolite plus platinum. Eighty-five grams of the calcined catalytic material was used to prepare a washcoat slurry with 120 grams of deionized water and 14.9 grams of NALCO 1056™ (26% silica/4% alumina) binder. The slurry was used to coat 1.5 inches×3.0 inches cordierite honeycomb with 2.1 g/in$^3$ of washcoat measured after drying at 100° C. and calcining at 550° C. The resulting catalyst member is designated C-2.

C. TEST

Figure 11:
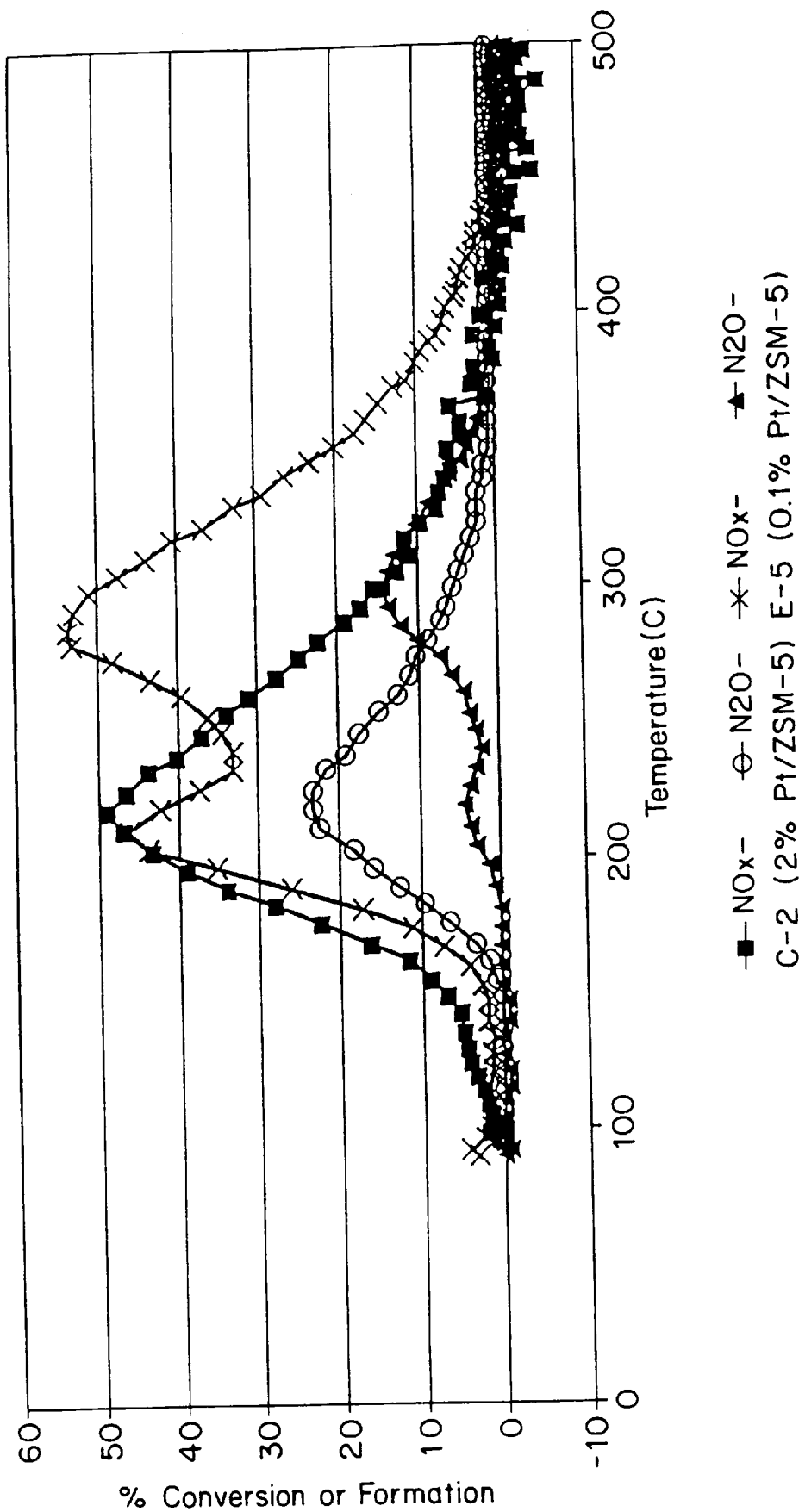
Figure 12:
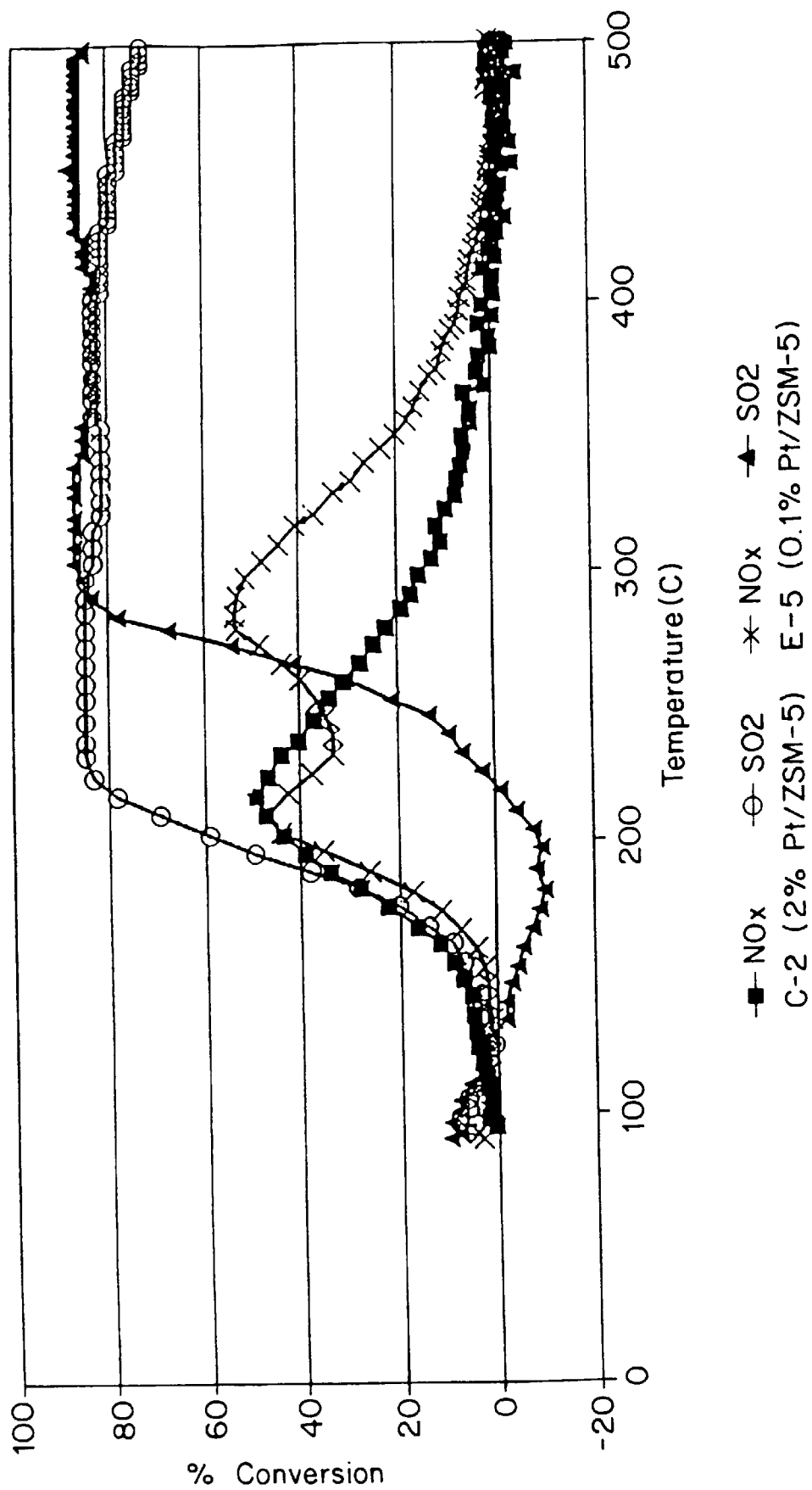
Figure 13:
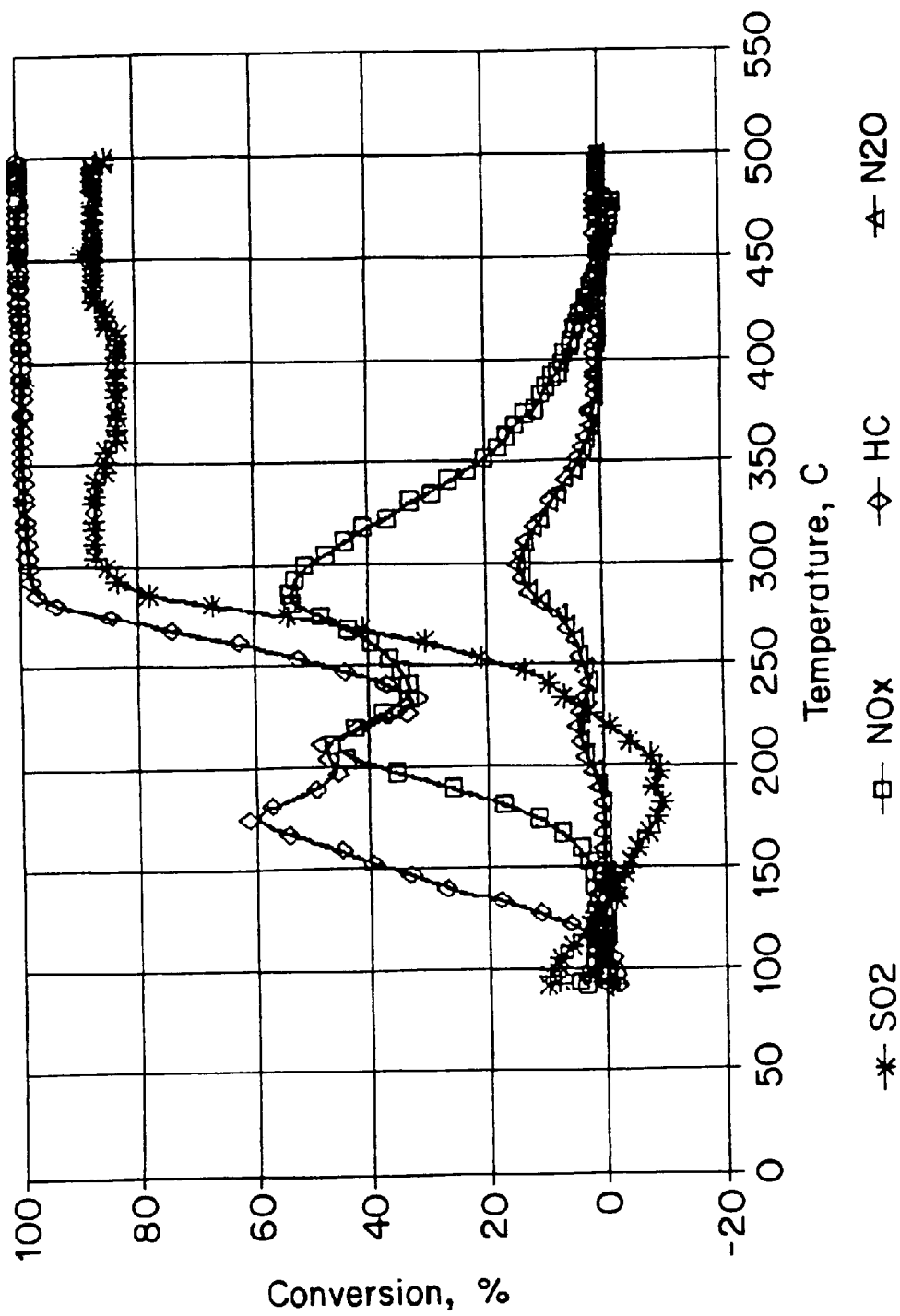

Catalyst member E-5 and comparative catalyst member C-2 were subjected to the steady feed stream, rising temperature Test Procedure D described above. The results are set forth in FIGS. 11 and 12. FIGS. 11 and 12 illustrate that catalyst member E-5 exhibited $NO_X$ conversion over a broader temperature range than comparative catalyst member C-2. FIG. 11 shows that $N_2O$ production by comparative catalyst C-2 exceeded that of catalyst member E-5, particularly at lower temperatures, i.e., around 200° C. FIG. 12 shows that comparative catalyst member C-2 began converting $SO_2$ to $SO_3$ at about 175° C., whereas $SO_2$ conversion by catalyst member E-5 did not occur until around 250° C. Thus, FIGS. 11 and 12 show that by limiting the quantity of platinum in the catalytic material, $NO_X$ conversion is attained over a broader temperature range and $N_2O$ and $SO_3$ formation are reduced, particularly at lower temperatures. The conversion and formation activity data of FIGS. 11 and 12 for catalyst member E-5 are set forth again in FIG. 13 together with the observed hydrocarbon conversion rate to illustrate that the catalytic material was effective to convert hydrocarbons as well as $NO_X$.

EXAMPLE 6

Figure 14:
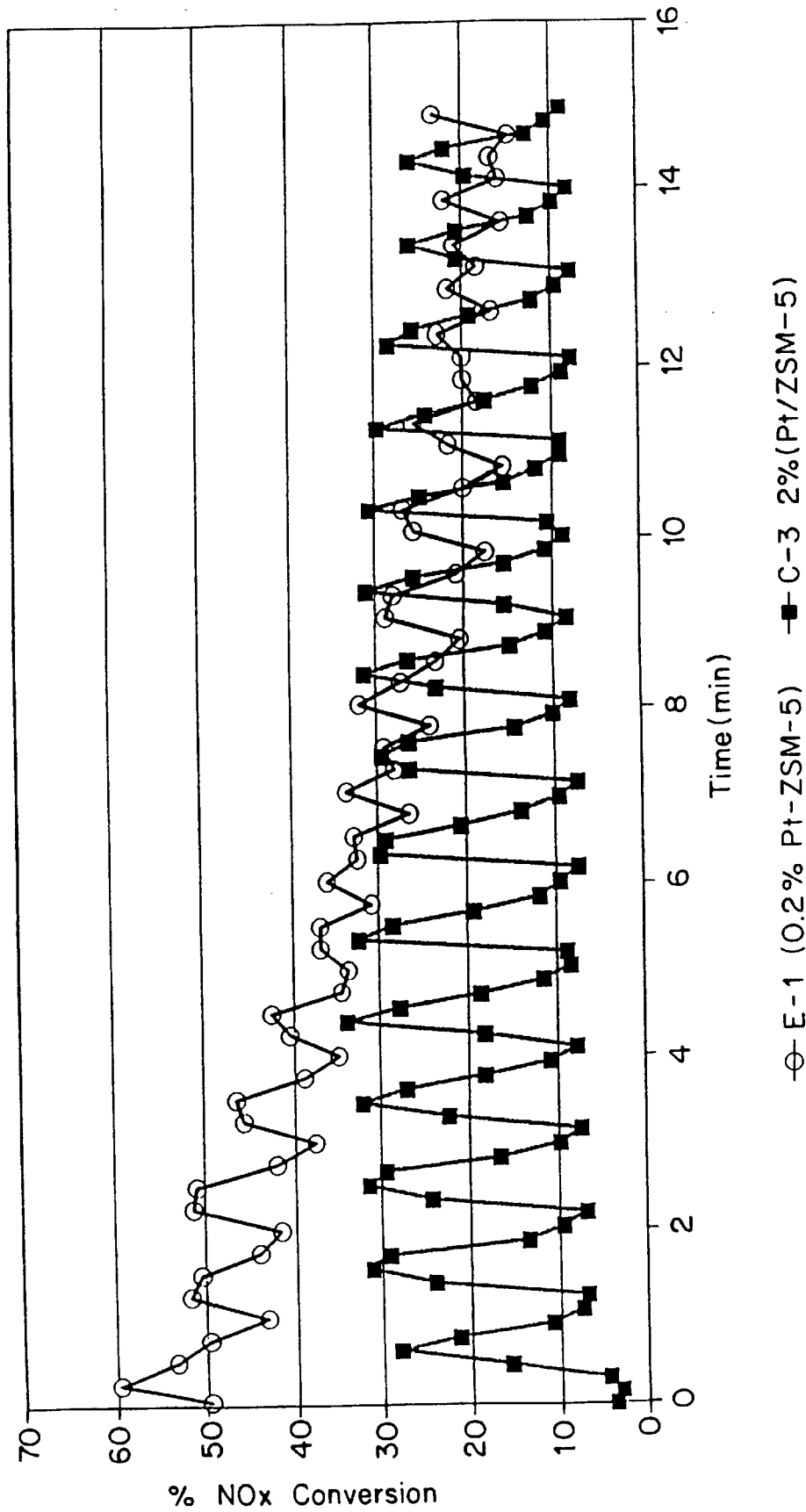

Comparative catalyst member C-2 (2% Pt ZSM-5) was subjected to hydrocarbon pulse testing as described in Test Procedure B, at 200° C. The results are set forth in FIG. 14, together with the pulse test result of catalyst member E-1 (0.2% Pt ZSM-5) from FIG. 1. It is clear that from FIG. 14 the pulsing results of a catalytic material in accordance with the present invention are superior, especially during the first fifteen minutes of time on stream, relative to that of the comparative catalytic material. In particular, catalyst member C-2 exhibited extremely large variations in conversion rates between the hydrocarbon-on and hydrocarbon-off modes, indicating a lack of catalytic activity during the hydrocarbon off modes that suggests that the catalytic material was unable to store reductant species. Further, the conversion rates during the hydrocarbon on modes were lower for catalyst member C-2 than for E-1 for about the first seven minutes of the test. These data illustrate that the advantages of hydrocarbon pulsing is best realized with zeolite-based catalytic material having a low platinum loading.

EXAMPLE 7

A. PREPARATION OF CATALYST MEMBER C-3

A 0.2% Pt-Na-ZSM-5 catalytic material was prepared by placing 150 grams of ZSM-5-type material which is believed to have a silica: alumina ratio of 27 and to be pre-calcined to remove the template, in a solution comprising 100 grams of $NaNO_3$ dissolved in 600 ml water. The mixture was stirred at room temperature for two hours to exchange sodium cations into the zeolite material. The material was then filtered and washed with one liter of water and dried in air overnight.

A platinum salt solution was prepared by dissolving 0.53 grams of $Pt(NH_3)_4Cl_2$ in 250 ml water. One hundred fifty grams of the Na-ZSM-5 material was added to the platinum solution, and the mixture was ball milled and comprised 35% solids by weight. The catalyst material was coated onto a carrier substrate and was dried at 100° C. and calcined at 550° C. for two hours. The resulting catalyst member is designated C-3.

B. PREPARATION OF CATALYST MEMBER E-6

A 0.1% Pt-ZSM-5 material was prepared using the same ZSM-5-type material used to prepare catalyst member C-3 by dissolving 0.212 grams of $Pt(NH_3)_4Cl_2$ in 650 ml water. The pH of the solution was adjusted to 10.5 using a solution of $NH_4OH$. One hundred grams of the ZSM-5-type material was added to the solution and mixed therein for three hours at 45° C. The mixture was then filtered, washed with water and coated onto a honeycomb carrier substrate which was then dried at 100° C. and calcined at 550° C. for two hours. The resulting catalyst member was designated E-6.

C. TESTS

Figure 15:
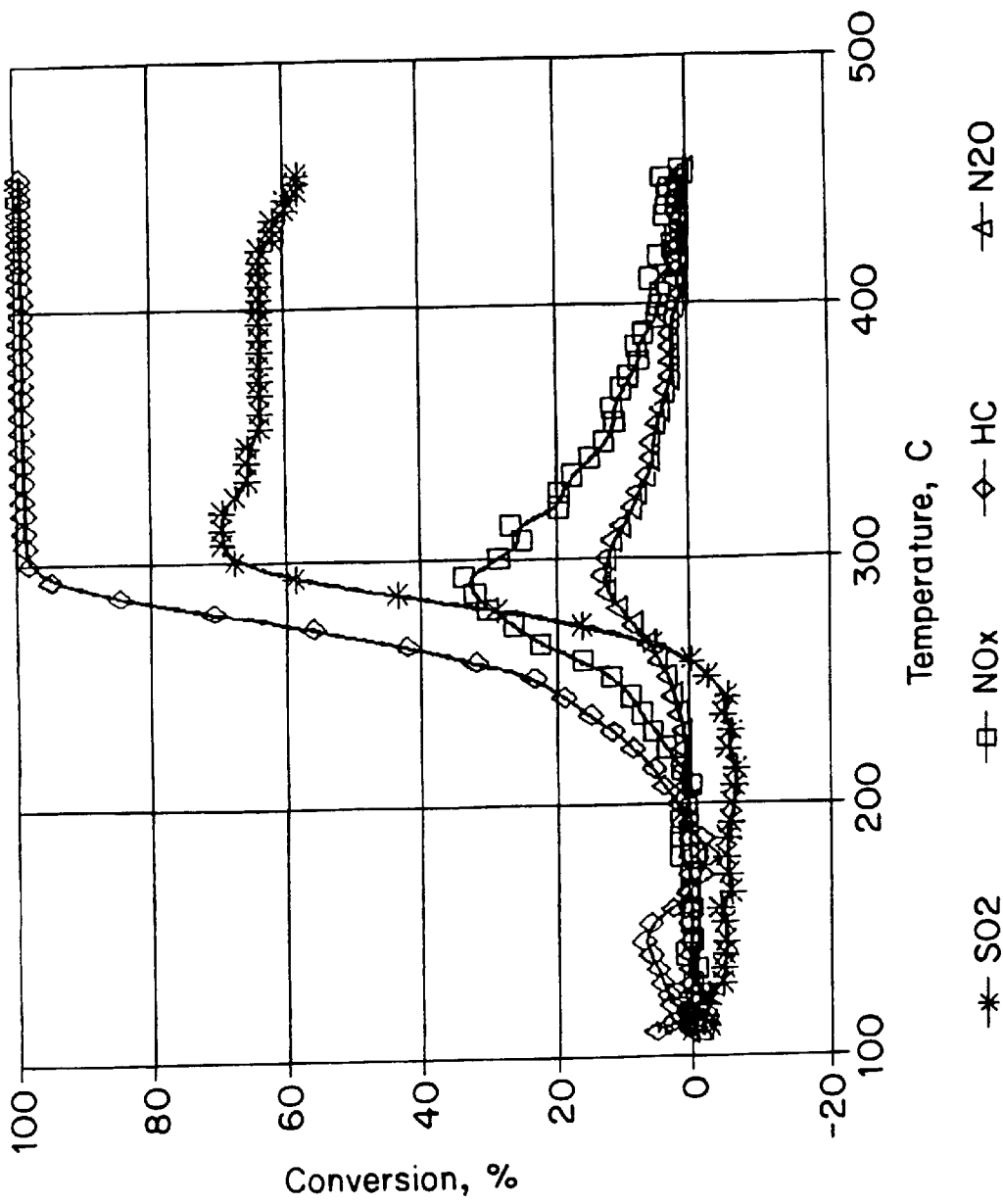
Figure 16:
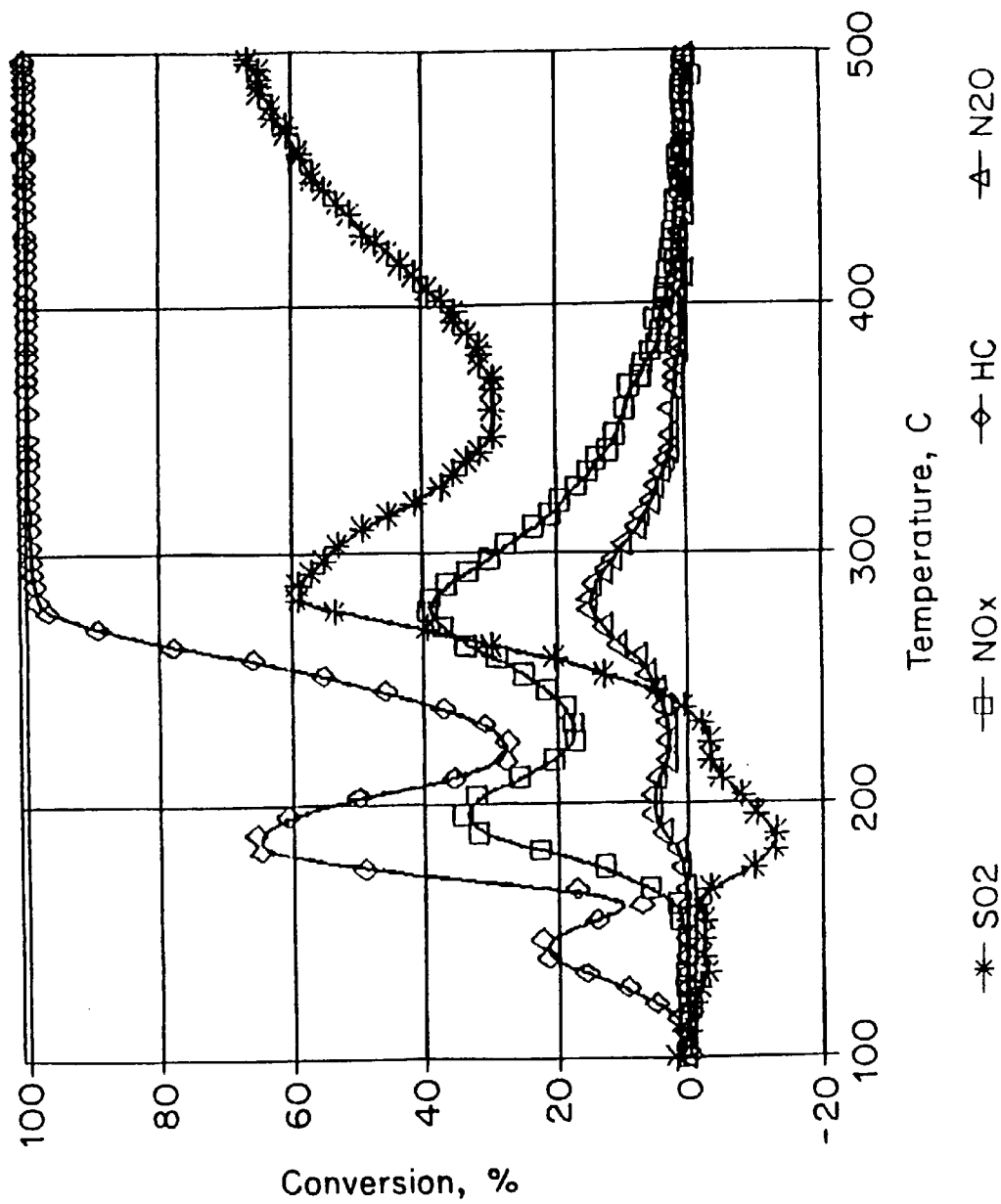

Catalyst members C-3 and E-6 were each tested in accordance with Test Procedure D described above. The $NO_X$, $SO_2$ and hydrocarbon conversion rates were plotted and are shown in FIGS. 15 and 16, respectively. FIG. 15 illustrates that catalyst member C-3 did not exhibit significant $NO_X$ conversion until a temperature of at least about 250° C. was attained. On the other hand, FIG. 16 shows that catalyst member E-6, which was prepared using acid form zeolite, exhibited a low temperature $NO_X$ conversion peak at about 200° C. which was not exhibited by catalyst member C-3. It is noted that catalyst member E-1 (0.2% Pt-ZSM-5), prepared from acid said form zeolite material also exhibited a low temperature $NO_X$ conversion peak below 200° C.; no such peak is evident in the activity of catalyst member C-3.

While the invention has been described in detail with reference to particular embodiments thereof, it will be apparent that upon a reading and understanding of the foregoing, numerous alterations to the described embodiments will occur to those skilled in the art and it is intended to include such alterations within the scope of the appended claims.

What is claimed is:

1. A method for making a catalytic material useful for the reduction of $NO_X$ comprising incorporating a catalytically effective amount of a catalytic species into a template-bearing molecular sieve material, and then calthe molecular sieve material, whereby the template is removed from the molecular sieve material after the catalytic species is incorporated therein.

2. The method of claim 1 wherein the molecular sieve material comprises an acid-form zeolite material selected from the group consisting of ZSM-5 and Beta-zeolite.

3. A method for making a catalytic material useful for the reduction of $NO_X$ comprising depositing a blocking agent onto a molecular sieve material, incorporating a catalytically effective amount of a cataltyic species into the molecular sieve material having the blocking agent thereon, and then calcining the molecular sieve material, whereby the blocking agent is removed from the molecular sieve material after the catalytic species is incorporated therein.

4. The method of claim 3 wherein the molecular sieve material is selected from the group consisting of ZSM-5, Y-zeolite, mordenite, Beta-zeolite, omega-zeolite, rho-zeolite, borosilicates and iron silicates.

5. The method of claim 2 or claim 4 wherein the catalytic species comprises a platinum group metal.

6. The method of claim 1 or claim 3 wherein the molecular sieve material comprises ZSM-5, the method comprising incorporating platinum into the ZSM-5 in an amount of less than about 2% by weight ZSM-5 plus platinum.

* * * * *

UNITED STATES PATENT AND TRADEMARK OFFICE
CERTIFICATE OF CORRECTION

| | | |
|---|---|---|
| PATENT NO. | : 6,150,291 | Page 1 of 1 |
| DATED | : November 21, 2000 | |
| INVENTOR(S) | : Michel Deeba, Jennifer S. Feeley and Robert J. Farrauto | |

It is certified that error appears in the above-identified patent and that said Letters Patent is hereby corrected as shown below:

<u>Column 12,</u>
Line 28, replace "calthe" with -- calcining the --

Signed and Sealed this

Second Day of July, 2002

Attest:

Attesting Officer

JAMES E. ROGAN
*Director of the United States Patent and Trademark Office*